(12) United States Patent
DeCosta

(10) Patent No.: US 10,605,287 B2
(45) Date of Patent: Mar. 31, 2020

(54) RAPID MOUNT WALL ANCHORING SYSTEM INCORPORATING A POWER FEED THROUGH CONNECTOR ASSEMBLY

(71) Applicant: Thomas DeCosta, Westport, MA (US)

(72) Inventor: Thomas DeCosta, Westport, MA (US)

( * ) Notice: Subject to any disclaimer, the term of this patent is extended or adjusted under 35 U.S.C. 154(b) by 402 days.

(21) Appl. No.: 15/613,228

(22) Filed: Jun. 4, 2017

(65) Prior Publication Data

US 2017/0356480 A1    Dec. 14, 2017

Related U.S. Application Data

(60) Provisional application No. 62/392,740, filed on Jun. 9, 2016.

(51) Int. Cl.
| | |
|---|---|
| *F16B 21/00* | (2006.01) |
| *F16B 13/08* | (2006.01) |
| *H02G 1/00* | (2006.01) |
| *H02G 3/00* | (2006.01) |
| *F16B 13/10* | (2006.01) |

(52) U.S. Cl.
CPC ........... *F16B 13/0808* (2013.01); *H02G 1/00* (2013.01); *H02G 3/00* (2013.01); *F16B 2013/105* (2013.01)

(58) Field of Classification Search
CPC .................................................. F16B 13/0808
USPC ...................... 411/340; 174/58; 439/374, 478
See application file for complete search history.

(56) References Cited

U.S. PATENT DOCUMENTS

| | | | | | |
|---|---|---|---|---|---|
| 3,950,059 | A | * | 4/1976 | Anhalt | H01R 13/193 439/261 |
| 4,784,610 | A | * | 11/1988 | Stuart | H01R 13/633 174/67 |
| 5,478,249 | A | * | 12/1995 | Crestin | H01R 13/4536 439/138 |
| 7,300,025 | B2 | * | 11/2007 | Korcz | H02G 3/123 220/3.9 |
| 8,044,300 | B1 | * | 10/2011 | Gretz | H02G 3/123 174/57 |
| 8,076,575 | B1 | * | 12/2011 | Gretz | H02G 3/123 174/481 |
| 2002/0160645 | A1 | * | 10/2002 | Nagamine | H01R 13/6273 439/352 |
| 2006/0091272 | A1 | * | 5/2006 | Piel | F16B 13/0808 248/231.9 |

* cited by examiner

*Primary Examiner* — Gary W Estremsky

(57) ABSTRACT

A rapid mount wall anchoring/power delivery system to both mount electrical devices and deliver power to the devices through a series of mateable connectors. The wall anchoring system includes a rigid frame with a lip having an opening therein, a rearward extending sidewall surrounding the opening, rearwardly extending guide members extending rearward from the sidewalls, a rigid mounting plate within the opening, and means to secure the wall anchoring system to a wall. The rigid mounting plate is snap fit into the opening of the rigid frame and the mounting plate includes a second opening for the mateable connection of a power delivery connector assembly. The connector assembly includes at one end a generally L shaped connector that is preferably overmolded, the connector includes gripping means to facilitate mounting of the connector to the mounting plate second opening. The connector includes an end lip with a width wide enough to ensure a tight fit that is still capable of slidable engagement into the mounting plate second opening.

10 Claims, 23 Drawing Sheets

RAPID MOUNT WALL ANCHORING SYSTEM INCORPORATING A POWER FEED THROUGH CONNECTOR ASSEMBLY

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 61/855,370 entitled "Grommet Assembly for Wall Panels", naming Thomas DeCosta as inventor, filed May 14, 2013, U.S. provisional patent application 61/956,528 entitled "Grommet Assembly for Wall Panels", naming Thomas DeCosta as inventor, filed Jun. 10, 2013, U.S. provisional patent application 61/960817 entitled "Grommet Assembly for Wall Panels", naming Thomas DeCosta as inventor, filed Sep. 28, 2013, U.S. provisional patent application 61/962,115 entitled "Grommet Assembly for Wall Panels", naming Thomas DeCosta as inventor, filed Oct. 31, 2013, U.S. Utility patent application Ser. No. 14/120,287, entitled "Rapid Mount Wall Anchoring System With Cable Pass Through," naming Thomas DeCosta as inventor, filed May 14, 2014, and U.S. provisional patent application 62/392,740 entitled "Rapid Mount Wall Anchoring System With Cable Pass Through", naming Thomas DeCosta as inventor, filed Jun. 9, 2016.

BACKGROUND

1. Field of Use

The invention generally relates to the mounting and power interconnect of electrical devices on walls and in buildings and specifically to a rapid mount anchoring/power delivery system to both mount electrical device and deliver power to the devices through a series of mateable connectors. The anchoring system hardware is hidden behind the wall providing an aesthetically pleasing appearance at the wall area.

2. Description of Prior Art

Grommets have been used in interior space divider panel systems and standard walls for granting access through a wall to provide computer cables, data connection modules, electrical wires, plug outlets, jacks, and the like, to workstations or other locations/equipments.

For example, in numerous office environments, a multi-wall arrangement divides a space into individual, personal workstations that often require numerous electrical conduits, receptacles, computer connectors and telephone lines to be within easy reach at each of often differently configured work areas.

Grommet assemblies for the routing of cables are known in the art. For example, U.S. Pat. No. 8,357,853 is a rapid mount electrical cable entry device with a flexible slotted insert for routing low voltage cables through walls. The cable entry device includes a rigid low voltage frame with a plate having an opening therein, a rearward extending sidewall surrounding the opening, and a flexible insert within the opening. The flexible insert is removable to provide access to mounting fasteners on the inner periphery of the plate opening. All that is required for preparing the wall for installation of the cable entry device is a simple circular hole, which can be rapidly made in the sheet rock by a simple hole saw.

It would greatly improve these wall systems to 1.) allow for the rapid mounting of an electrical device (Speakers, cameras, televisions) to the structure without requiring a second mounting device and 2.) to provide an efficient connectorized power delivery system that includes mateable connectors and a direct interface to electrical device mounting platform.

A field installed rapid mount wall anchoring system incorporating a power feed through connector assembly, usable in horizontal ceilings and vertical walls, for the mounting of structures, including electrical devices, having the capabilities to 1.) support the weight of such structures, 2.) and provide an efficient connectorized power delivery system that includes mateable connectors and a direct interface to electrical devices would be desirable.

SUMMARY OF THE INVENTION

The invention is a rapid mount anchoring/power delivery system to both mount electrical devices and deliver power to the devices through a series of mateable connectors. The wall anchoring system includes a rigid frame with a lip having an opening therein, a rearward extending sidewall surrounding the opening, rearwardly extending guide members extending rearward from said sidewalls, and a rigid mounting plate within the opening. The rigid mounting plate is snap fit into the opening of the rigid frame and the mounting plate includes a second opening for the mateable connection of a power delivery connector assembly. The connector assembly includes at one end a generally L shaped connector that is preferably overmolded, the connector includes gripping means to facilitate mounting of the connector to the mounting plate second opening. The connector includes an end lip with a width wide enough to ensure a tight fit that is still capable of slidable engagement into the mounting plate second opening.

The rigid mounting plate is removable to provide access to mounting fasteners integral to the guide members and positioned on the inner periphery of the plate opening. All that is required for preparing the wall for installation of the wall anchoring system is a simple circular hole, which can be rapidly made in the sheet rock by a simple hole saw. To secure the rigid frame to the wall, the mounting fasteners with attached clamp arms on the frame, and the guide members are passed through the hole in the wall and the clamp arms are rotated to draw the clamp arms toward the mounting plate.

After the frame is secured to the wall, the rigid plate insert is reinserted within the plate opening and thus provides a load bearing support for devices mounted on the plate. Prior to reinserting the load bearing support plate into the frame opening the overmolded connector is mated within the support plate second opening for power delivery to the electrical device secured thereon.

A center positioned threaded bore of the rigid plate is in alignment with a second threaded bore further rearward of the plate. The second threaded bore is formed within a cross member that rigidly connects the guide members at their distal ends. The first and second threaded bores accept a fastening screw for securement of a device to the plate, and allows for the load of the attached device to be distributed throughout the rapid mount anchoring/power delivery system.

Several advantages are achieved with the rapid mount wall anchoring system of the present invention, including: (1) The wall anchoring system provides a support base for mounting electrical devices and structures to a wall (2) The wall anchoring system can be secured to a wall in less than a minute as wall preparation requires only a standard size hole saw (3) The wall anchoring system can accommodate ¼-inch to 1.5-inch wall thicknesses (4) The wall anchoring system can safely secure weights of up to 90 lbs and (5) The wall anchoring system includes an efficient connectorized power delivery system that includes mateable connectors and a direct interface to a supported electrical device.

These and other objects and advantages of the present invention will be better understood by reading the following description along with reference to the drawings.

BRIEF DESCRIPTION OF THE DRAWINGS

The foregoing and other objects, features, and advantages of the invention are apparent from the following detailed description taken in conjunction with the accompanying drawings in which.

DETAILED DESCRIPTION

In the following description, the same numerical references refer to similar elements. The embodiments, geometrical configurations, materials mentioned and/or dimensions shown in the figures or described in the present description are preferred embodiments only, given for exemplification purposes only.

Figure 4:
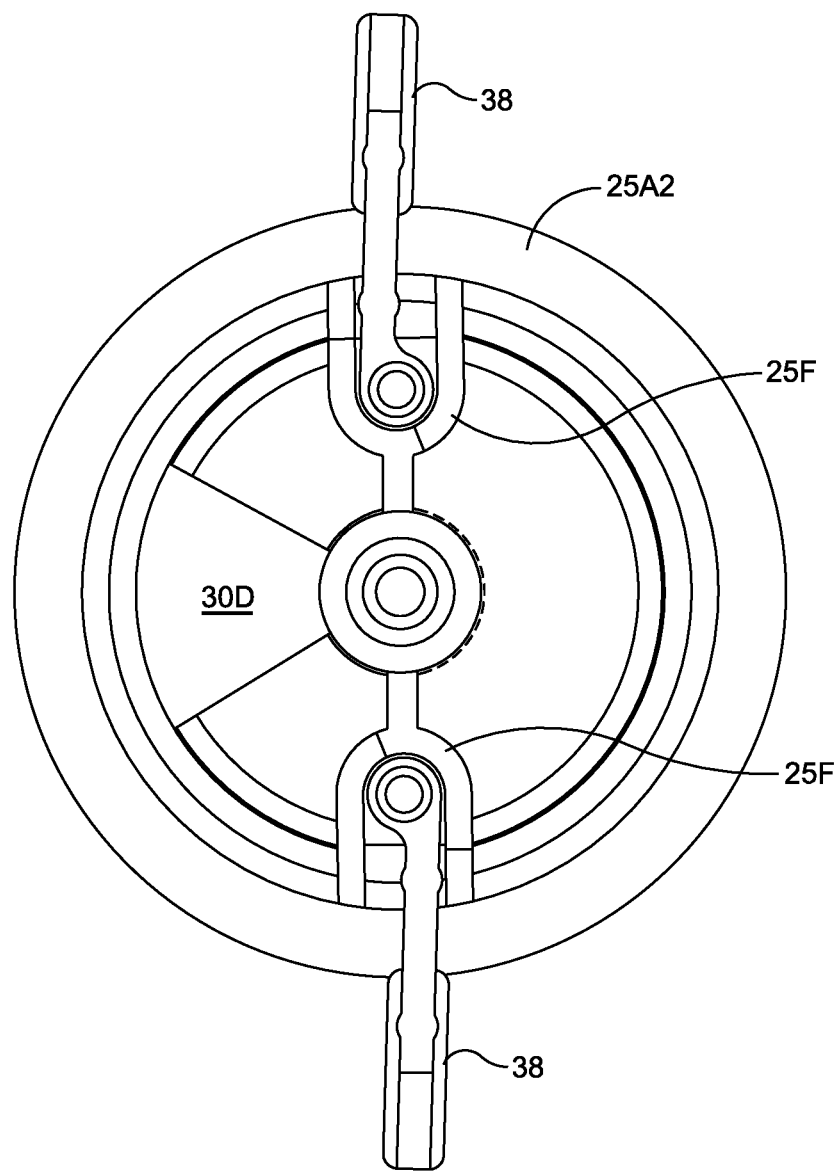
FIG. 4 top rear view of the rapid mount wall anchoring system of FIG. 1.
Figure 5:
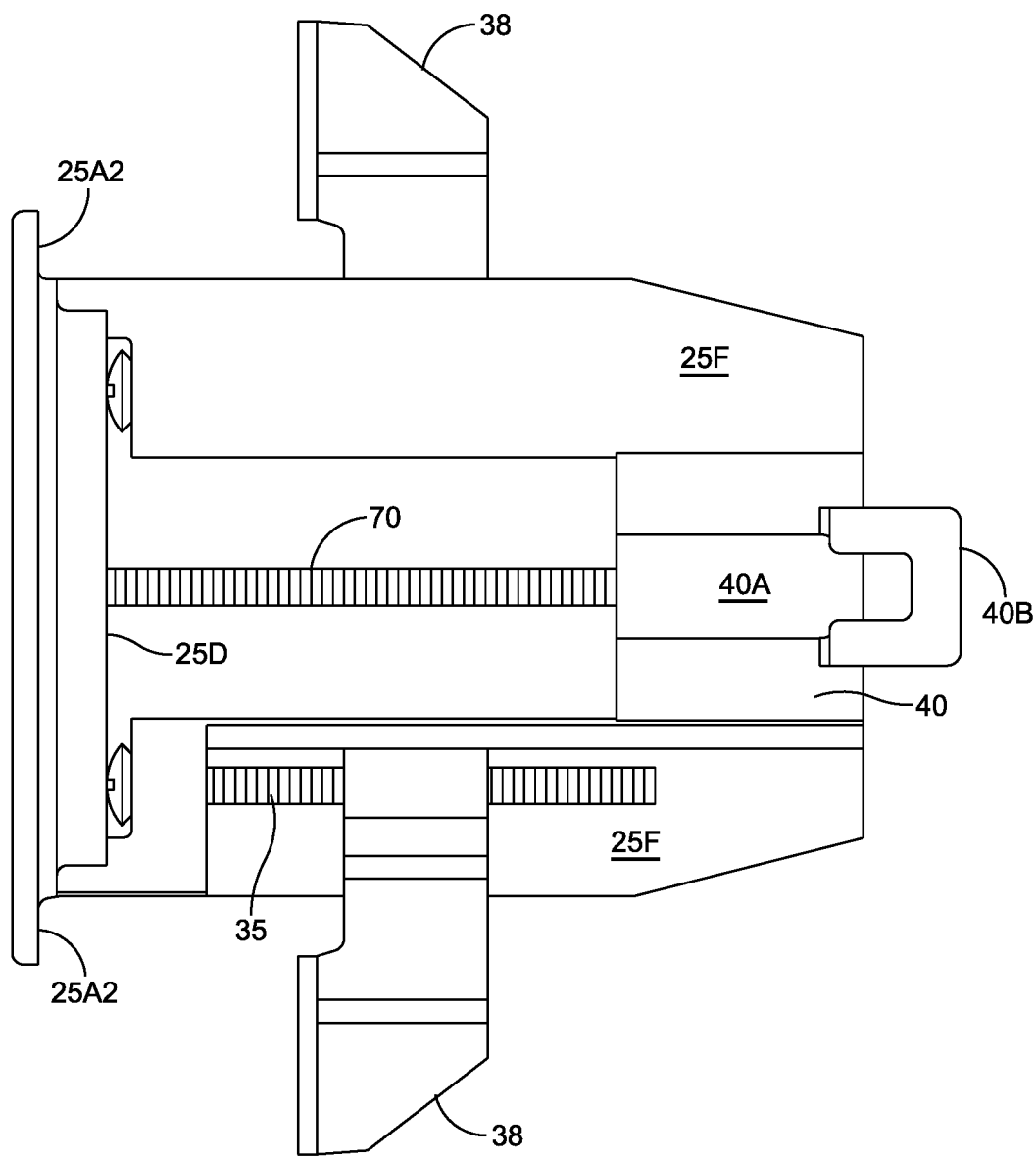
FIG. 5 is a left side view of the rapid mount wall anchoring system of FIG. 1.
Figure 6:
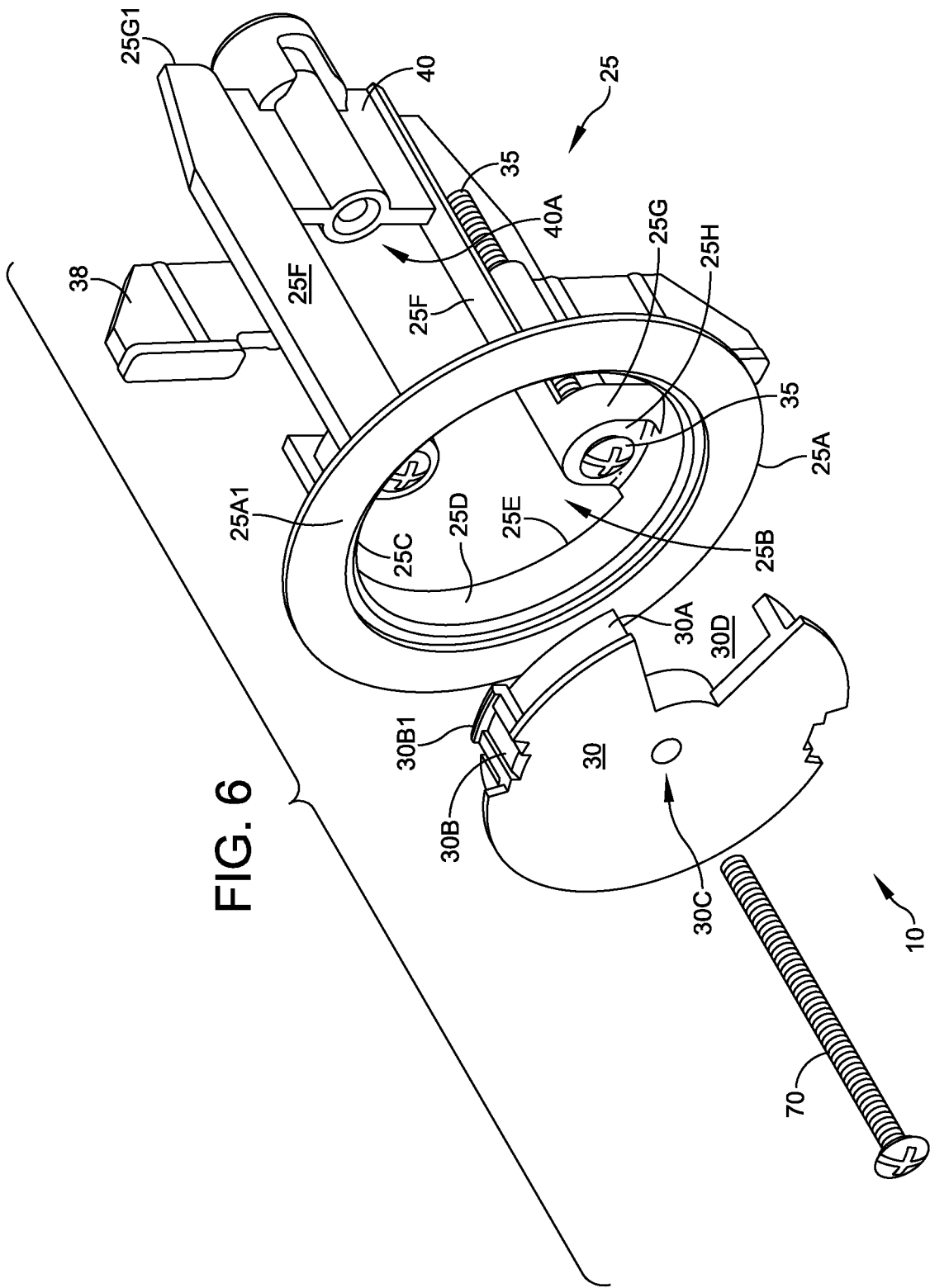
FIG. 6 is an exploded perspective view of the rapid mount wall anchoring system of FIG. 1, showing the mounting plate and fastening screw separated from the rigid frame.

In Referring to FIG. 6 there is shown a preferred embodiment of the present invention, a rapid mount wall anchoring system 10 with a rigid frame 25 and a load bearing plate 30. The rigid frame 25 includes a lip 25A having an opening 25B therein and an inner periphery 25C on the lip 25A surrounding the opening. Extending rearward from inner periphery 25C is a sidewall 25D extending to an outer periphery 25E. As illustrated in FIGS. 4 and 6, two guide members 25F aligned opposite each other, and integral with the plate 25, extend rearward from outer periphery 25E. The two guide members 25F include mounting bosses 25G include a face 25H including apertures therein (not shown). The lip 25A includes a front surface 25A1 and the faces 25H of the mounting bosses 25G are recessed away from the front surface 25A1 of the Lip 25A. Although two guide members are illustrated, a single guide member having a threaded bore arrangement in alignment with bore 30B could be utilized with reduced load bearing characteristics. Further, the guide member and mounting arrangement may be a single element or arranged separately without departing from the spirit and scope of the invention.

Figure 2:
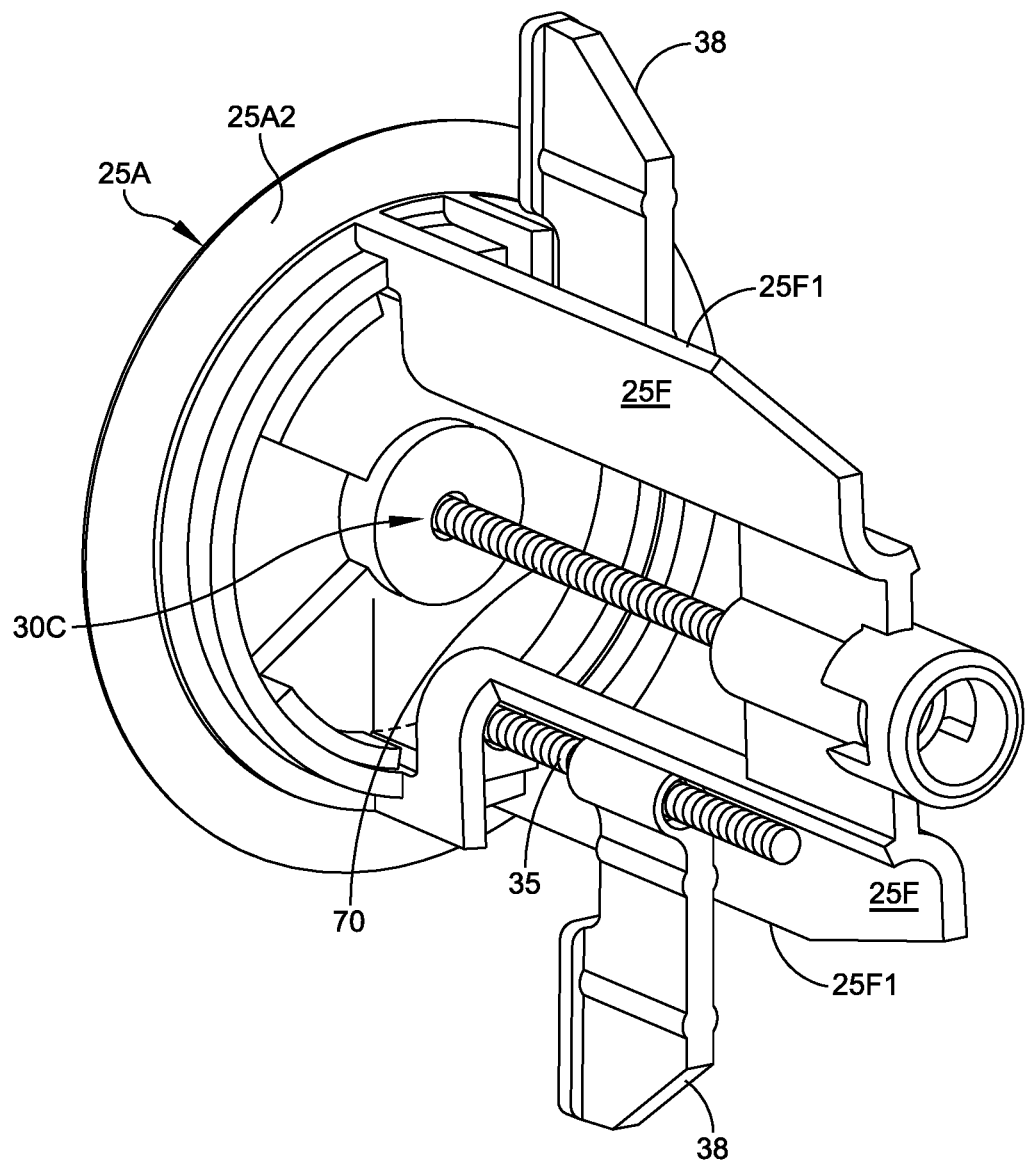
FIG. 2 is a rear perspective view of the rapid mount wall anchoring system of FIG. 1.
Figure 3:
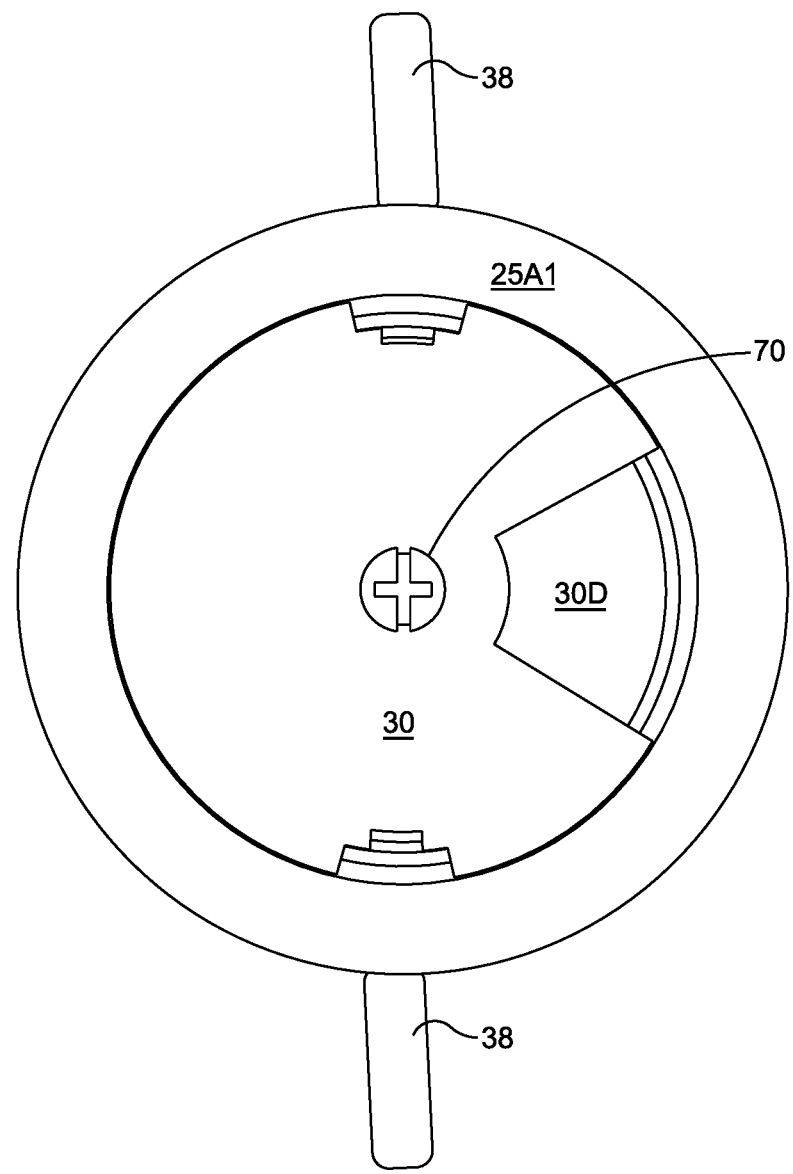
FIG. 3 is a top front view of the rapid mount wall anchoring system of FIG. 1.
Figure 7:
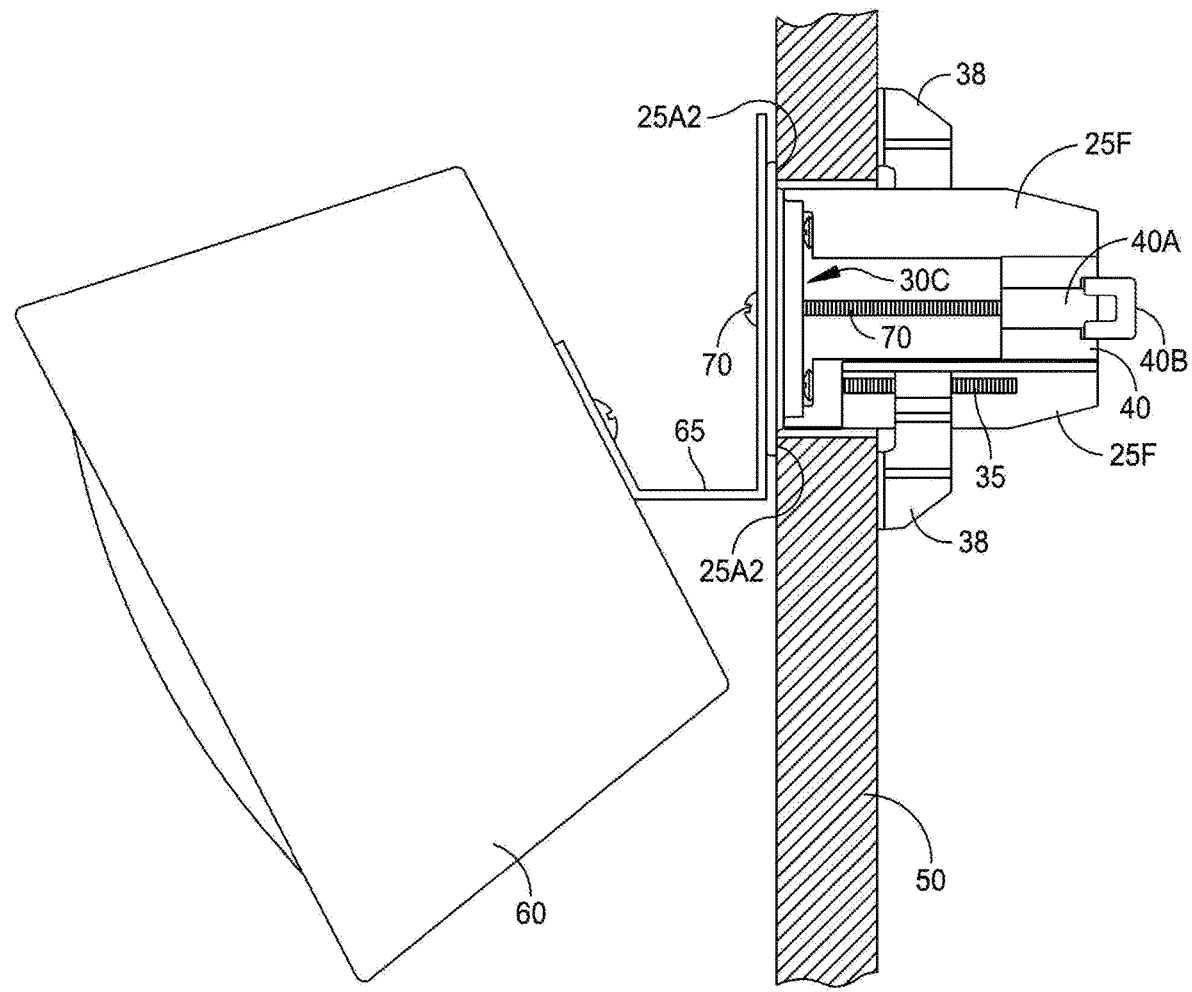
FIG. 7 illustrates the rapid mount wall anchoring system of FIG. 1, installed within a wall and supporting an attached device thereon.

Substantially long threaded fasteners 35 extend through mounting bosses 25G apertures and engage clamp arms 38. Clamp arms 38 include a threaded bore for engagement of threaded fasteners 35 to rotate clamp arms 38 between an extended position and retracted position as desired. The clamp arms 38 may also be rotated inward so they are confined within the perimeter of lip 25A. Referring to FIGS. 2 and 7, the wall anchoring system 10 can then be inserted into a circular hole in a wall, the hole having a diameter less than the diameter of lip 25A and preferably a diameter equal to the distance between guide member edges 25F1. This will allow for lip 25A rear surface 25A2 to engage the wall surface as illustrated in FIG. 7. The clamp arms 38 are then rotated outward and each threaded fastener 35 can be easily rotated within its aperture as desired by turning the head of the respective fastener 35 with an appropriate tool such as a screwdriver (not shown), causing the clamp arms 38 to pull rear surface 25A2 against wall 50.

In the preferred embodiment guide members 25F are situated 180 degrees apart having at one end mounting bosses 25G and opposite ends 25G1 connected via cross member 40. Cross member 40 includes a threaded bore 40A and wire hang 40B. Referring to FIGS. 2 and 6, Load bearing plate insert 30 includes a circular sidewall 30A and a threaded bore 30C positioned in alignment with threaded bore 40A. Threaded bores 30C and 40A accept threaded mounting fastener 70 for securement of devices to plate insert 30. Plate] 30 further includes connection means for securing plate insert 30 into opening 25B. In the preferred embodiment, the connection means are resiliently flexible tabs 30B having a lip 30B1 that engages outer periphery 25E locking plate 30 in place. When locked in place plate 30 circular sidewall 30A slideably engages sidewall 25D, allowing for plate 30 to be rotated to a limited degree up until lip 30B1 contacts mounting bosses 25G.

Plate insert 30 further includes an opening 30D for the passage of cables from an interior wall to a mounted device. As illustrated in FIG. 7, wall anchoring system 10 is shown installed within wall 50 for support and hanging of device 60. In the example, a brace 65 is screwed to anchoring system 10 by threaded mounting fastener 70 and the brace 65 supports device 60. As illustrated in FIG. 7, threaded mounting fastener 70 engages plate 30 through threaded bore 30C and Cross member 40 threaded bore 40A to support the load of device 60.

Although a separate brace 60 is illustrated, any device mounting arrangement may be utilized for engagement with fastener 70, including direct mounting to fastener 70. The combination of clamp arms 38, load bearing plate 30, and cross member 40 allow for the hanging of devices of significant weight. The wall anchoring system 10 has been shown to support weights of at least 90 lbs for plates 30 being less than 2 inches in diameter. For ceiling installations cross member 40 includes a wirehang 40B that may be connected to a wire (not shown) secured on one end to an interior roof stud. The wall anchoring system 10 may be molded of various plastics including polycarbonate, polyvinyl chloride, acrylonitrilebutadience styrene, and polyethylene, as well as others known in the art for the intended application of supporting a load.

Figure 16:
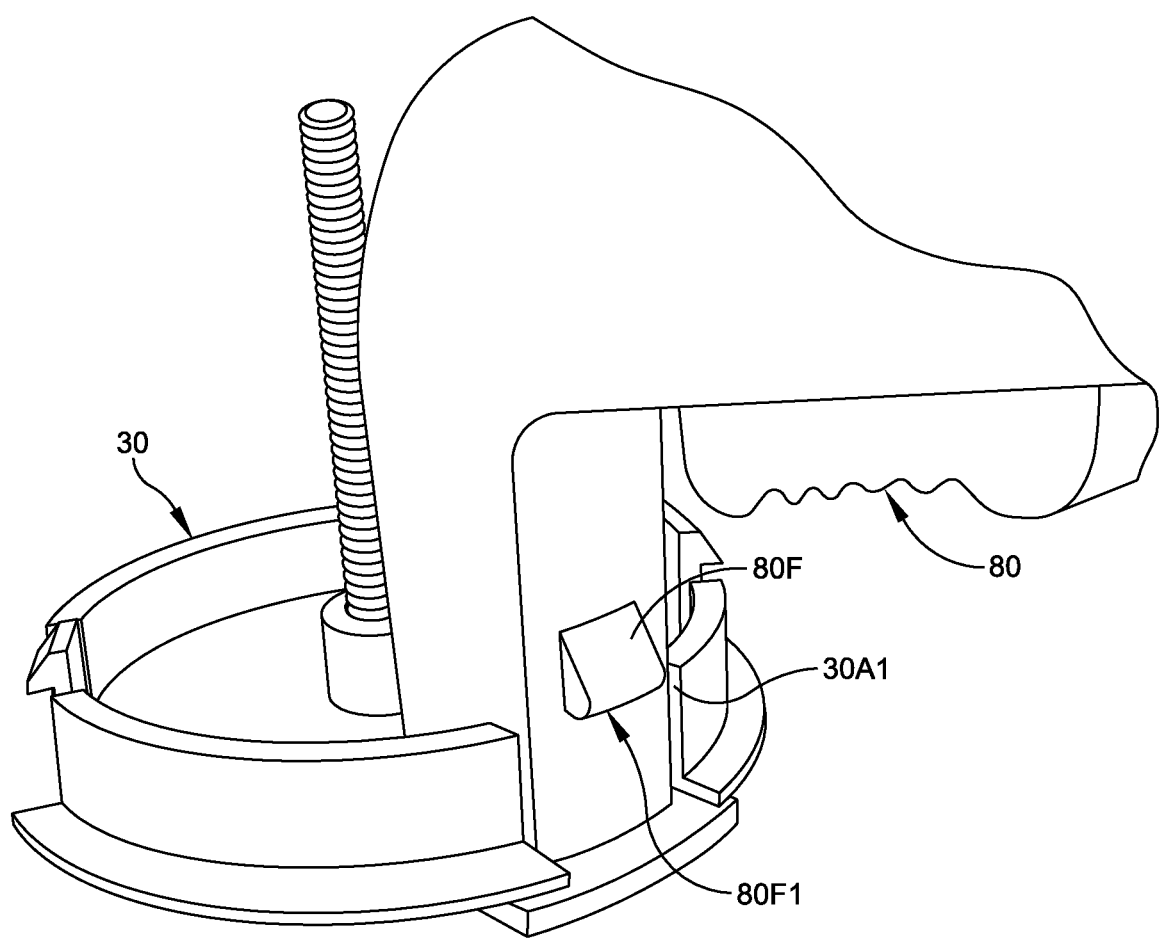
Figure 17:
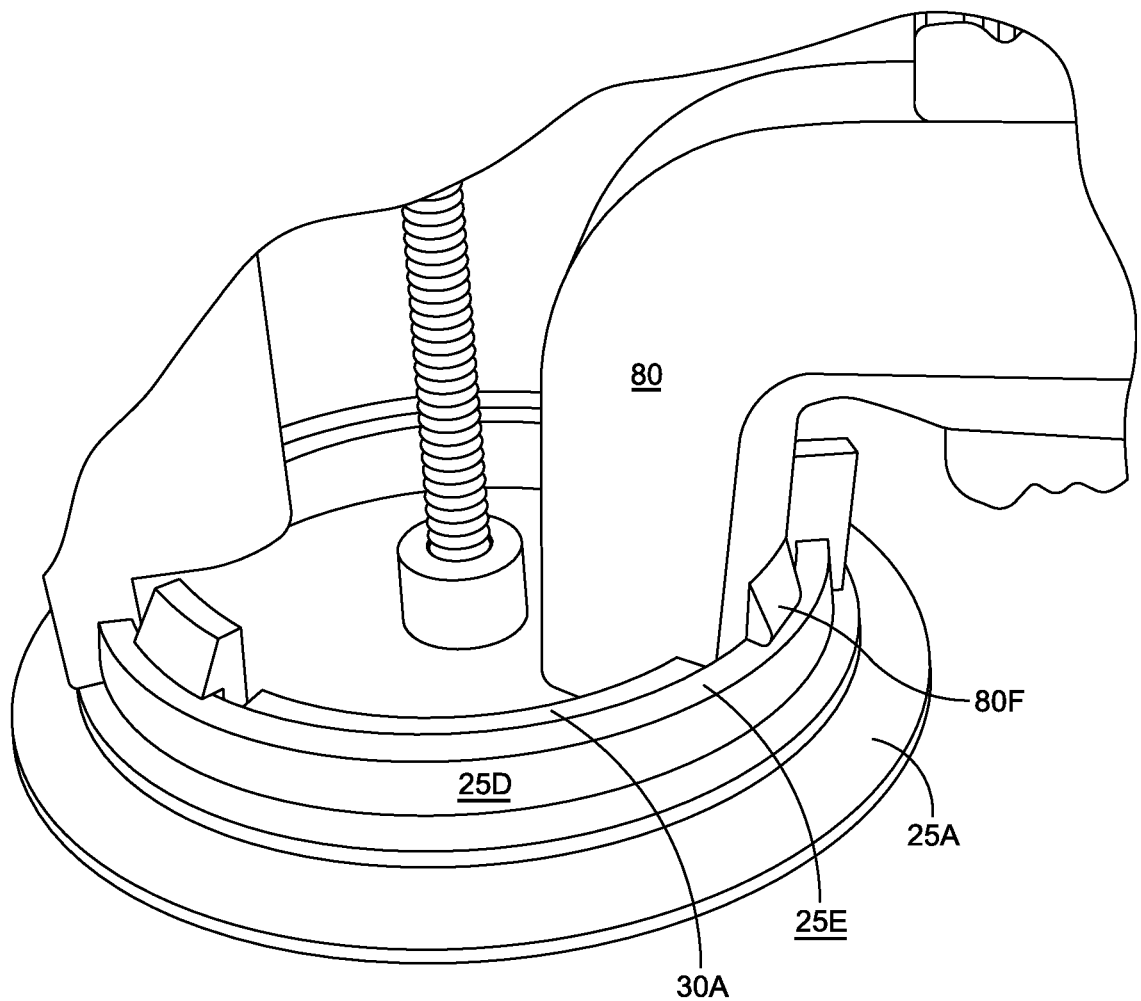
Figure 18:
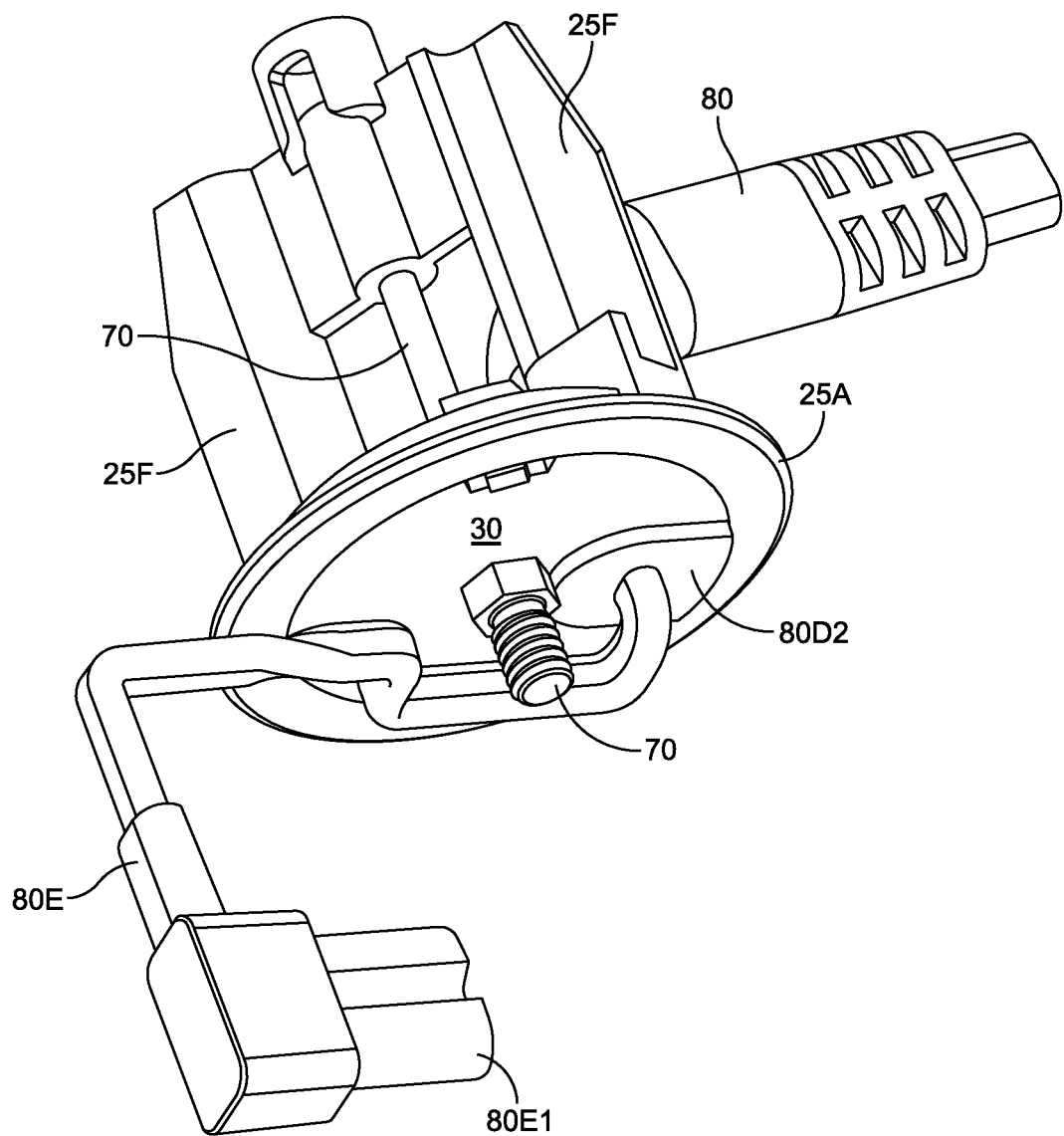
Figure 21:
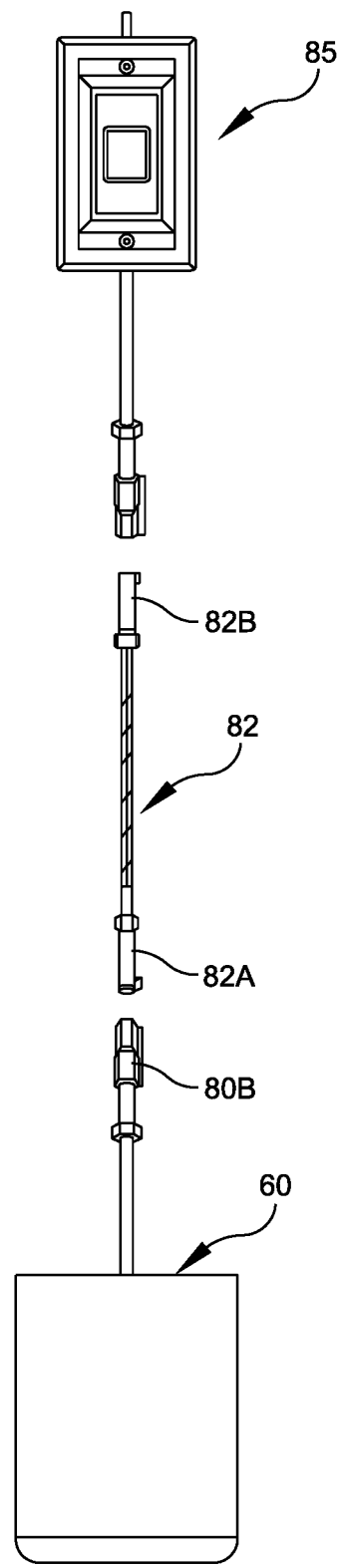
FIG. 21-23 illustrates a system for mounting a device to a wall and for providing power to the device.
Figure 22:
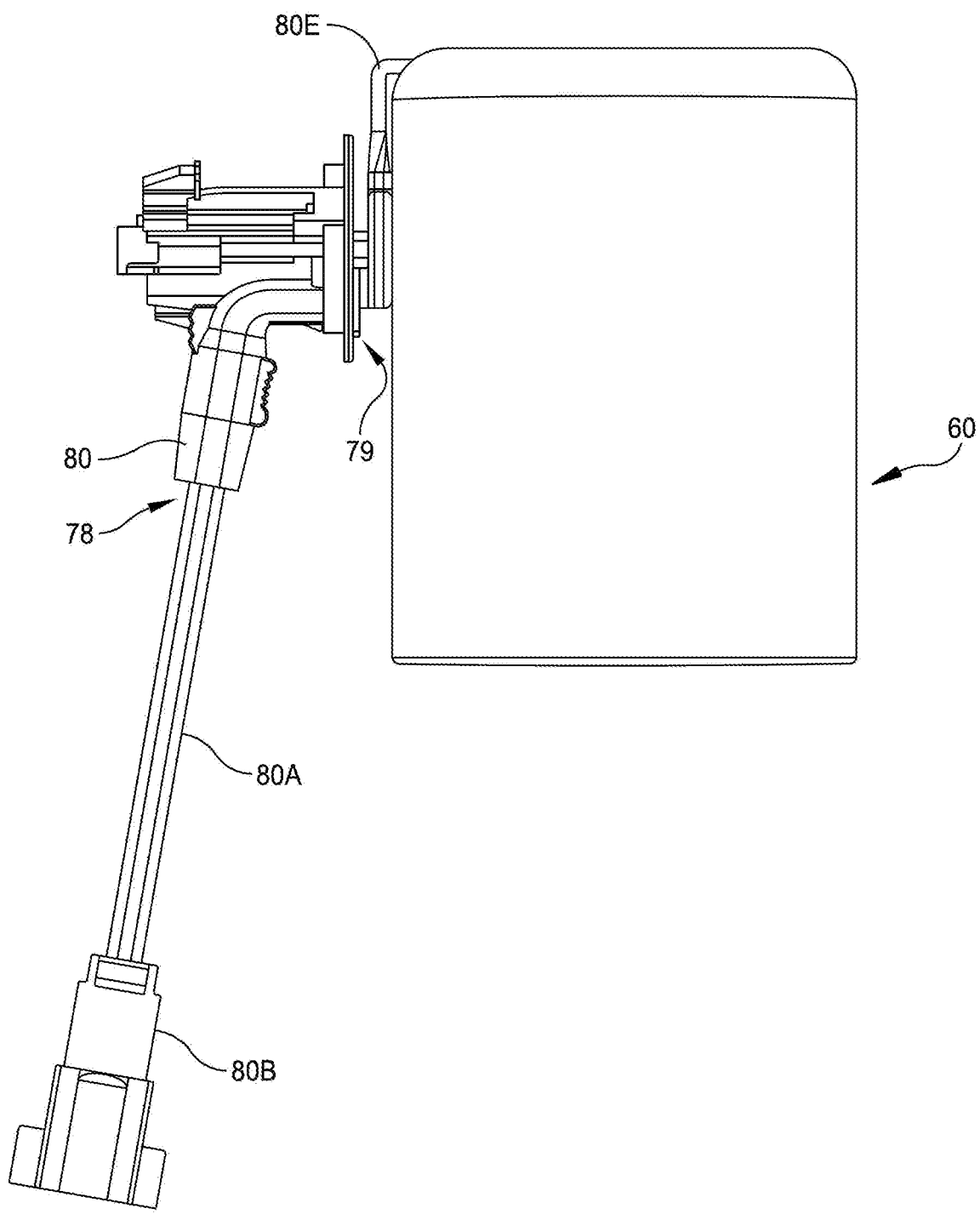
Figure 23:
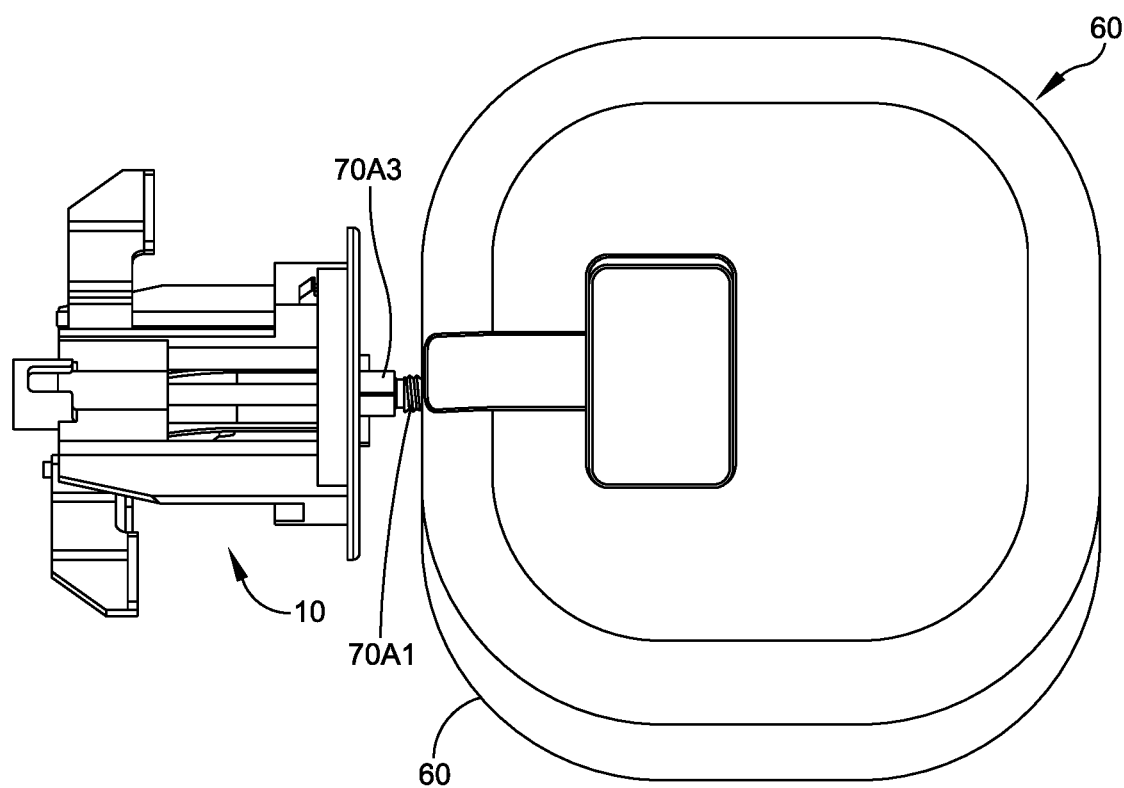

As illustrated in FIGS. 13-19, connector assembly 80 is integrated to plate 30 and wall anchoring system 10 (FIG. 18). Connector assembly 80 provides power to a device 60, such as a wall mounted speaker (FIGS. 21-23). Connector assembly 80 receives power from a source (not shown) via power input cable 80A at connector assembly 80 first end 78 as illustrated in FIG. 22. Connector 80 second end 79 provides a power source feed via device power cable 80E. As illustrated in FIG. 21, power may be provided via positionable power receptacles 85 for easy installation of a device without the need for electrical wiring. The power receptacles include overmolded connectors and are described in DeCosta U.S. Pat. No. 9,263,863, granted to applicant, and incorporated by reference herein.

Figure 8:
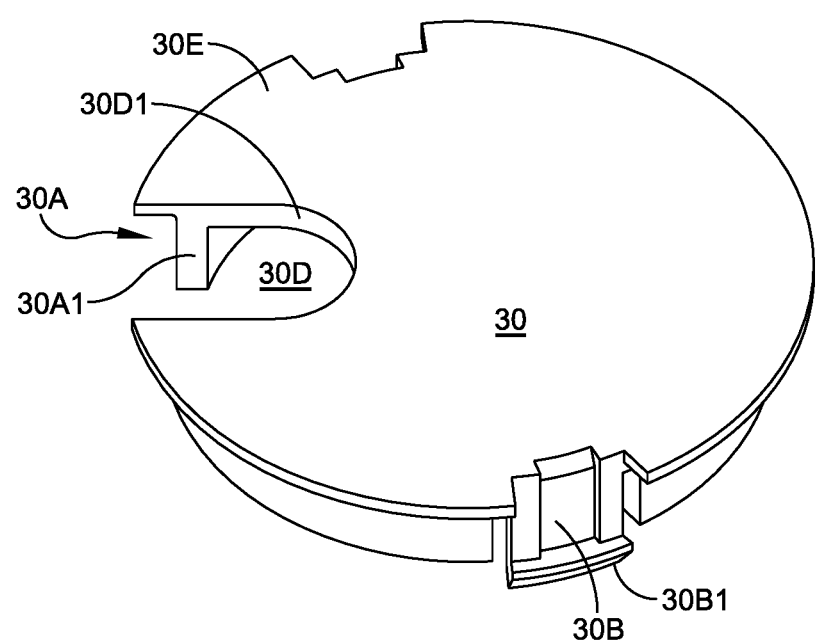
FIGS. 8,9 illustrate an alternative embodiment of plate insert 30.
Figure 9:
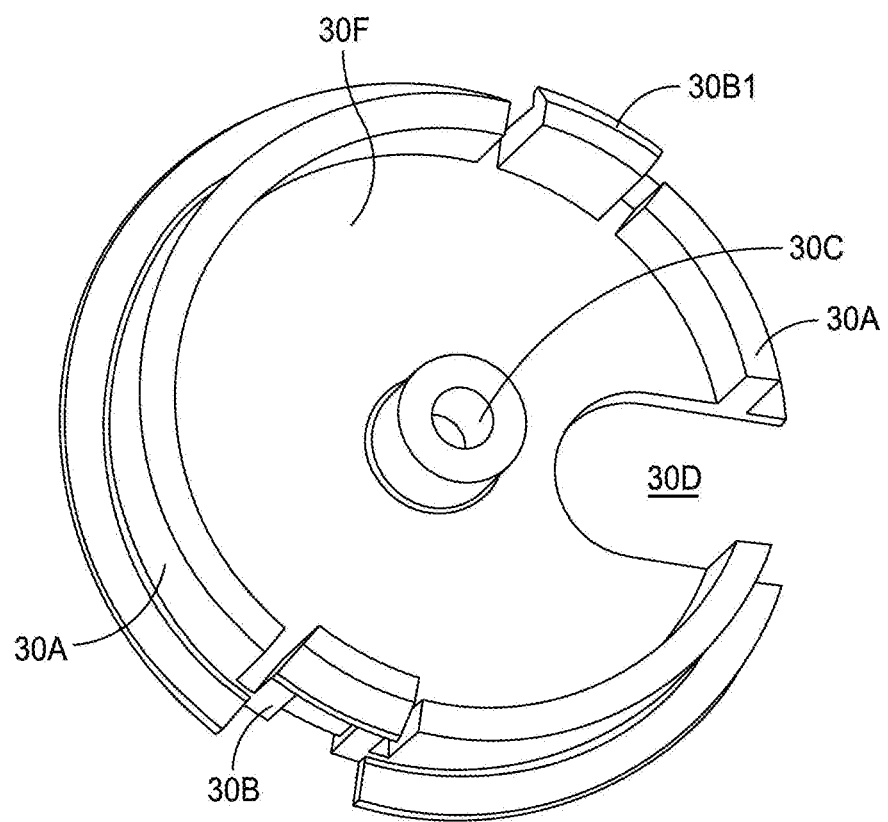
Figure 10:
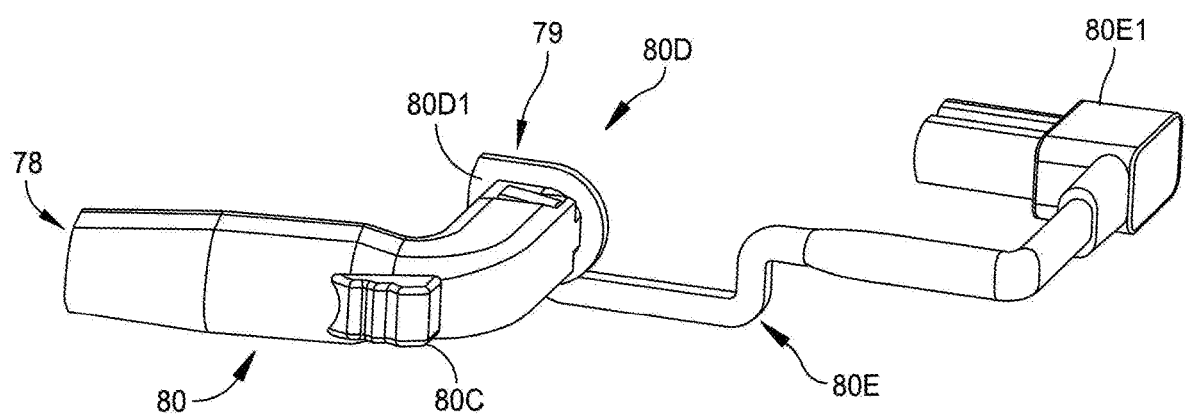
FIGS. 10-13 illustrate a connector assembly 80 for interface to anchoring system 10 and device 60.
Figure 11:
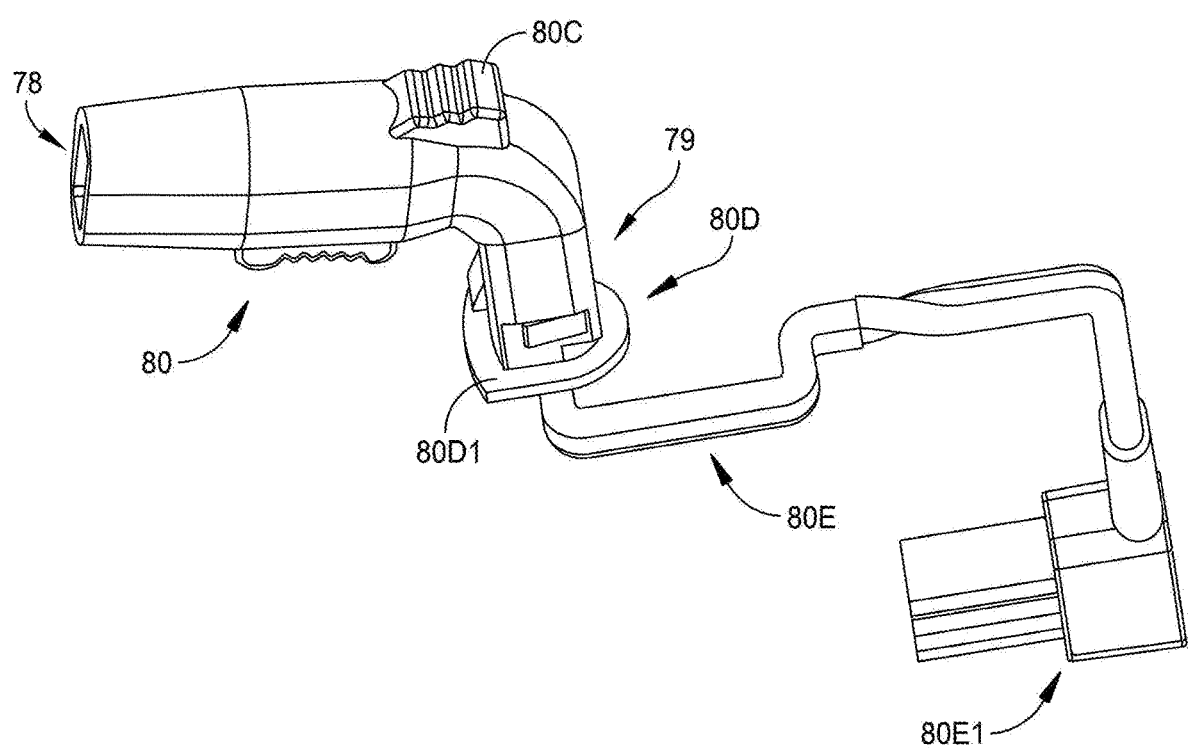
Figure 12:
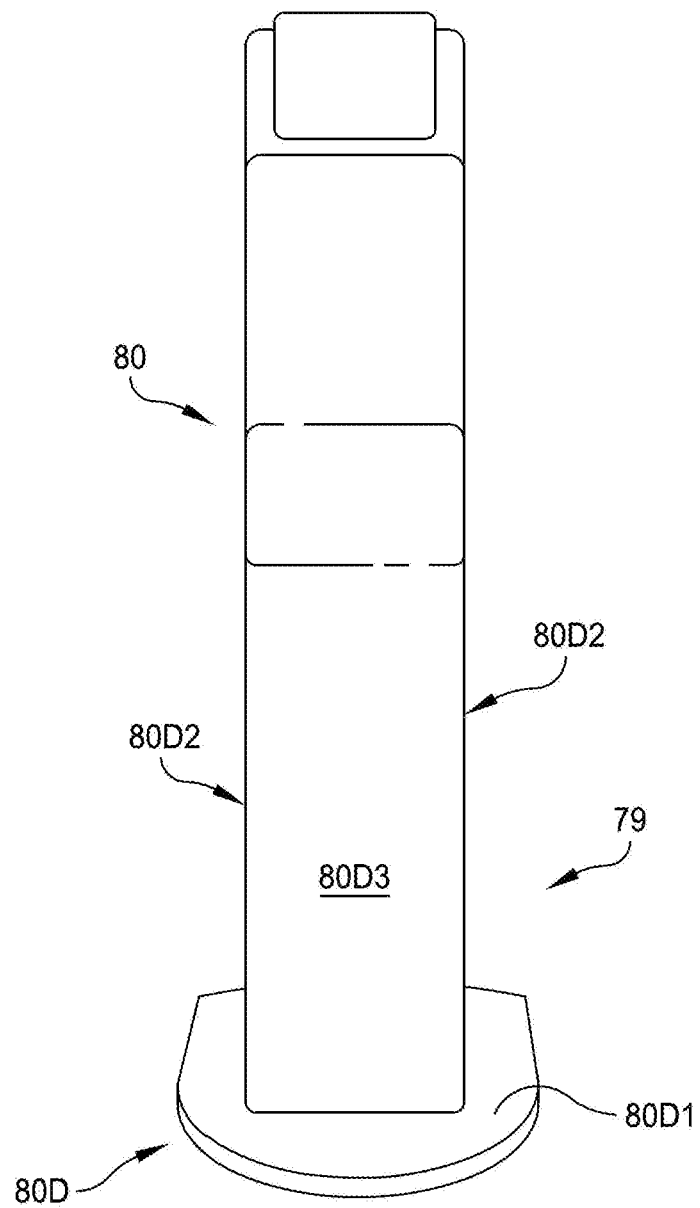
Figure 13:
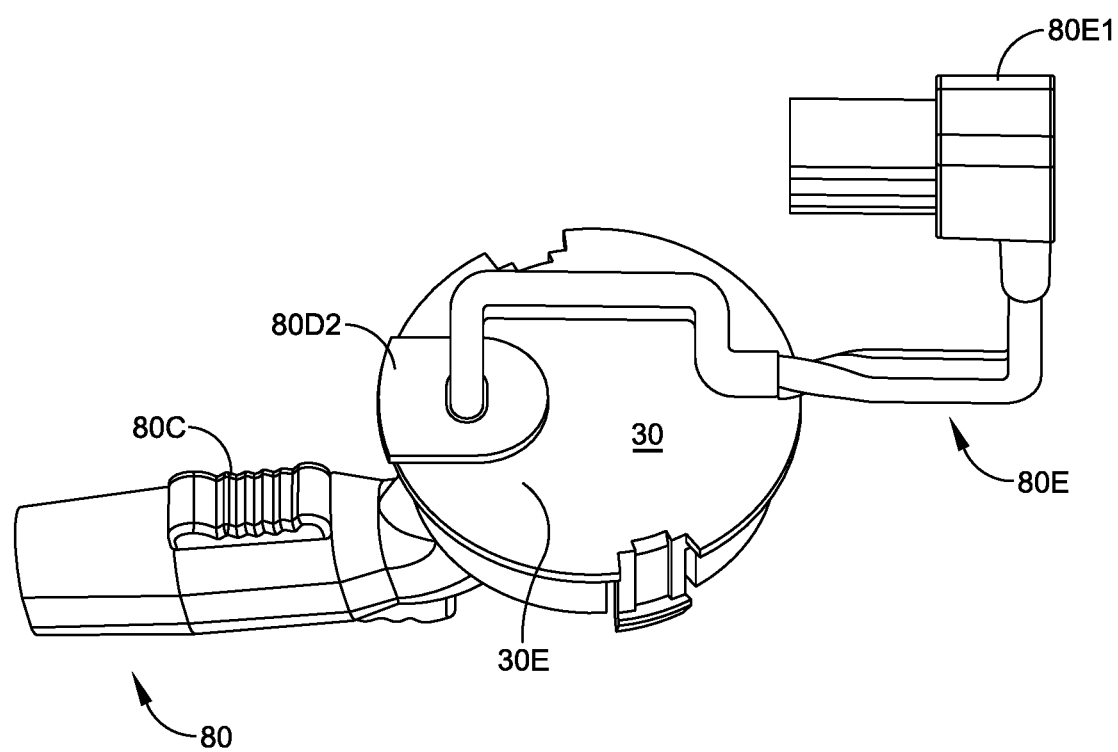
Figure 15:
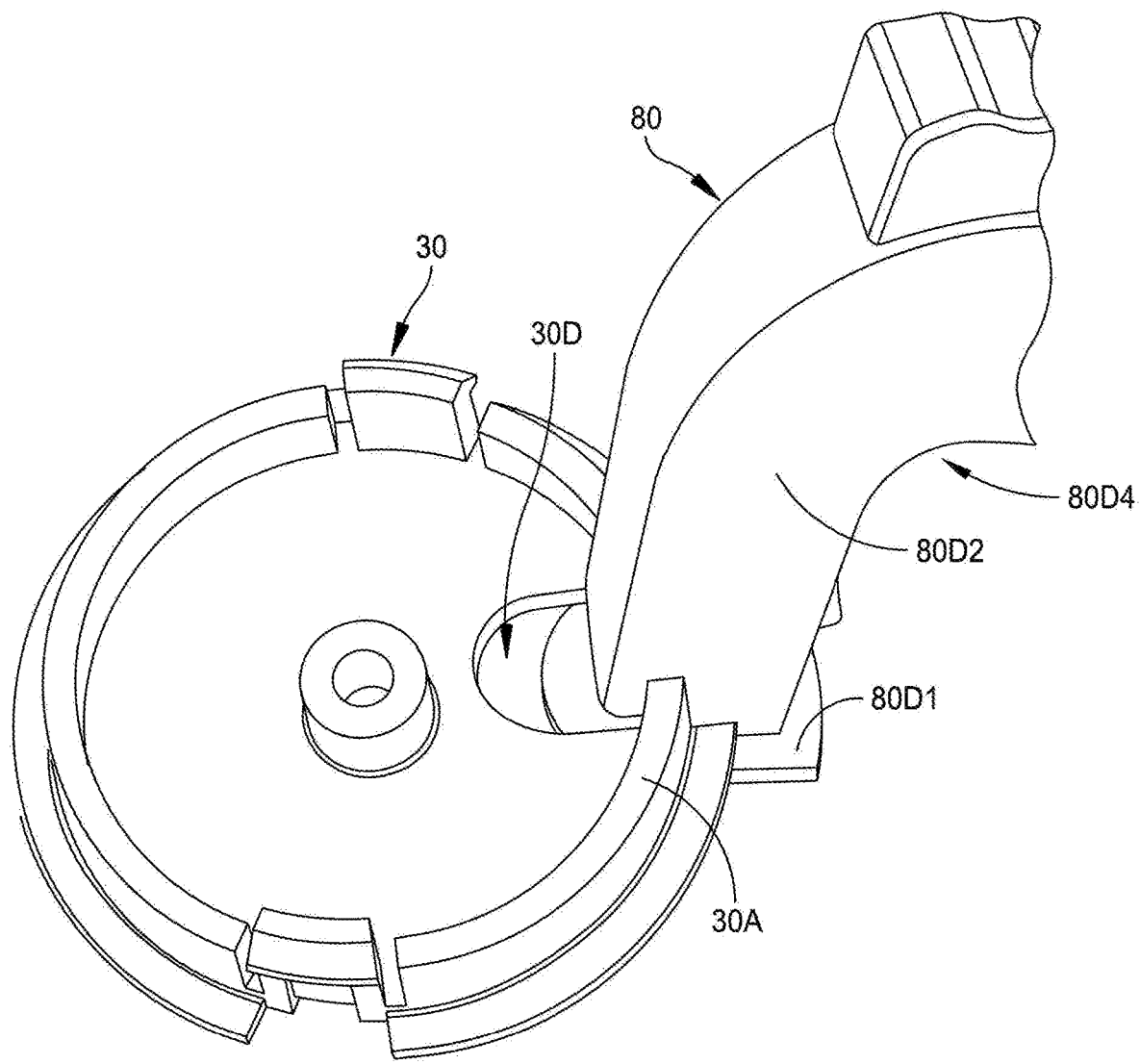

Referring to FIGS. 8 and 9, plate 30 includes an opening 30D having peripheral edges 30D1 and 30A1, a front surface 30E and a rear surface 30F. Referring to FIGS. 10 and 13, connector assembly 80 includes at one end a generally L shaped connector that is preferably overmolded, the connector includes a first end 78 and a second end 79, the first end 78 for receiving a power source input and the second end 79 for providing a power source feed. As illustrated in FIG. 11-13 connector 80 includes an end lip 80D having a top surface 80D1 and a bottom surface 80D2. Referring to FIGS. 12 and 15 Connector 80 second end 79 includes front surface 80D3, rear surface 80D4, and left and right side surfaces 80D2 that terminate into end lip 80D. Referring to FIG. 8 and FIG. 15, the width of connector 80 will allow connector 80 side surfaces 80D2, which are perpendicular to end lip 80D top surface 80D1, to have a tight fit into opening 30D while slideably engaging plate 30 opening 30D peripheral edges 30D1 and 30A1.

Figure 14:
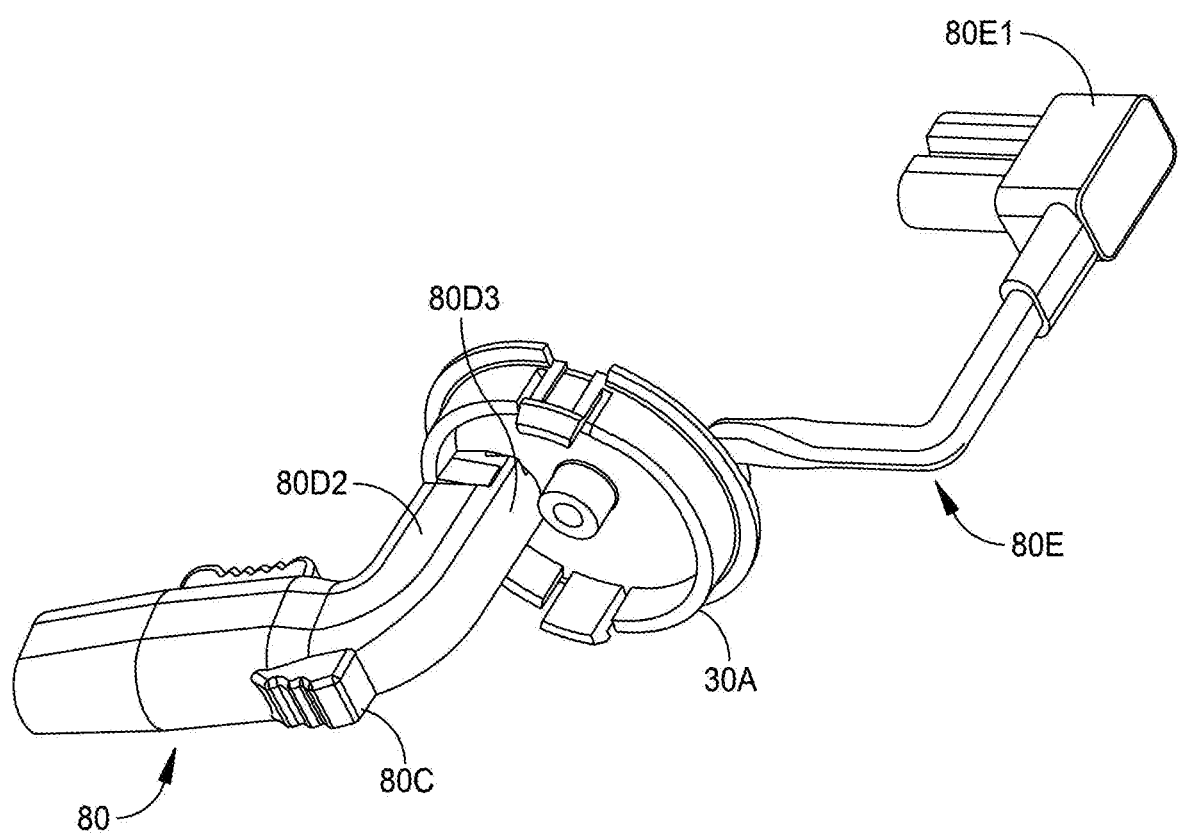
FIGS. 14-18 illustrate connector assembly 80 interfaced to plate insert 30.

As illustrated in FIG. 15, top surface 80D1 of end lip 80D engages opening 30D up to a point of full engagement where connector front surface 80D3 is fully engaged within opening 30D and contacting opening 30D peripheral edge 30D1 (See FIGS. 14 and 16). Connector 80 further includes a protuberance 80F with bottom surface 80F1. Gripping means 80C facilitates the tight placement of connector 80 inserted into opening 30D.

Figure 1:
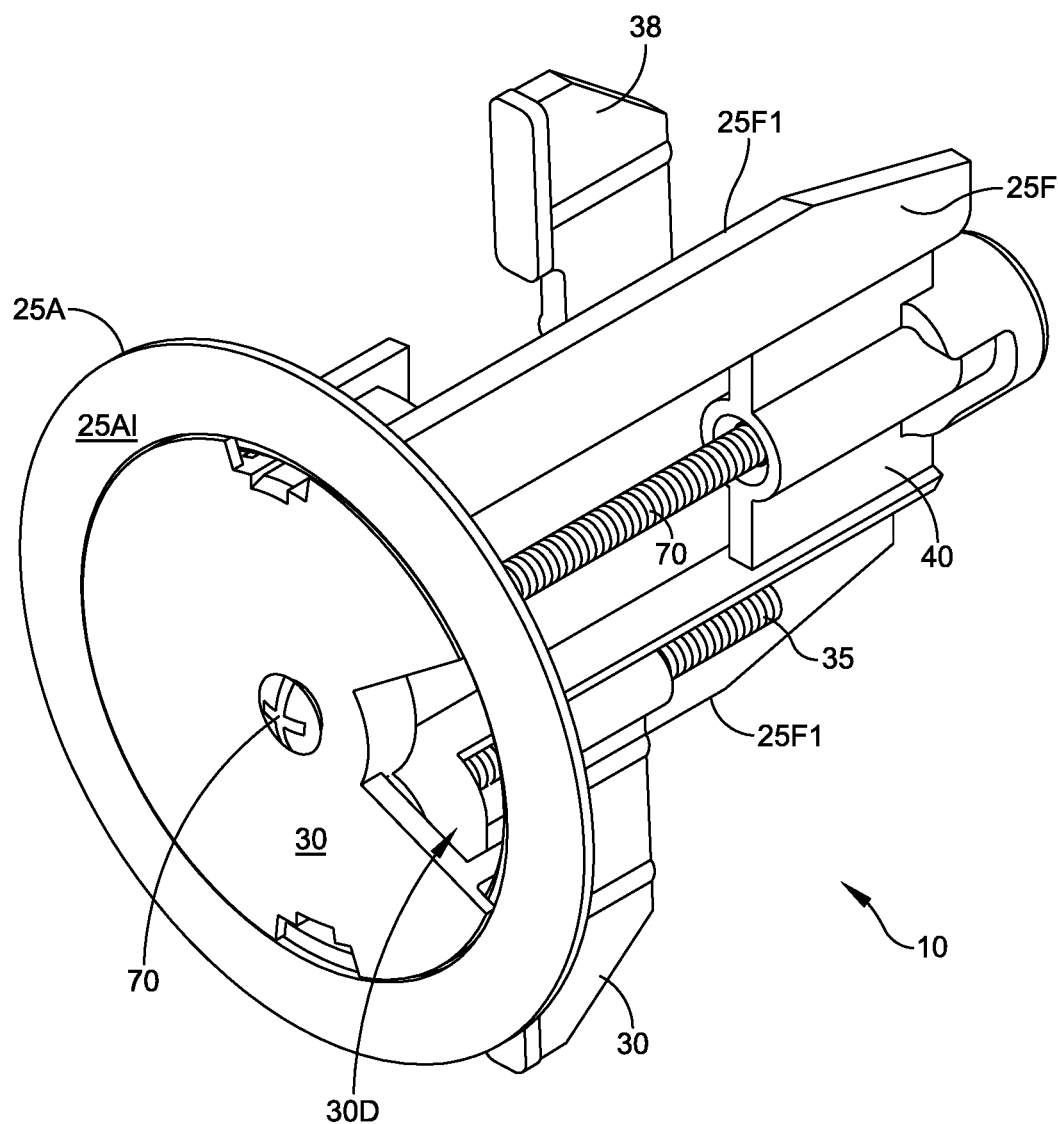
FIG. 1 is a front perspective view of the rapid mount wall anchoring system employing the principles of the present invention.
Figure 19:
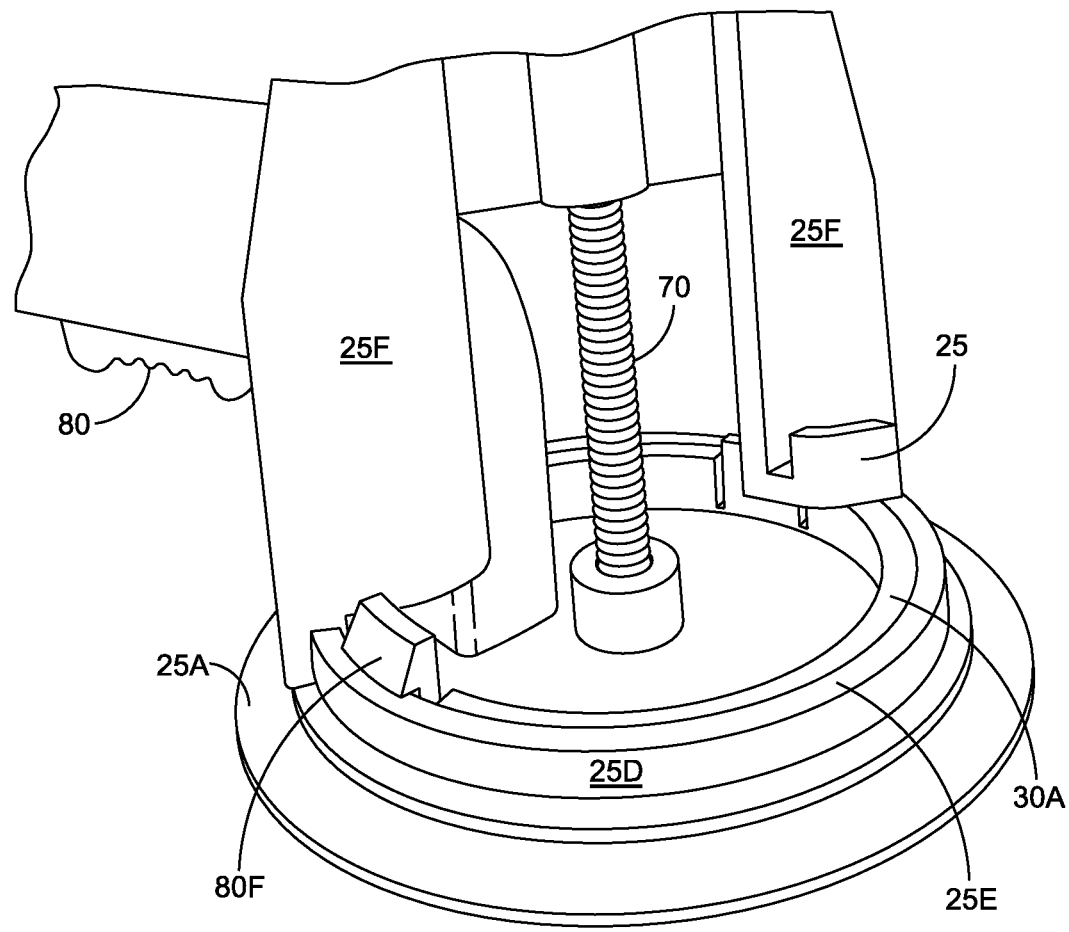
FIGS. 19 illustrates an alternate view of connector assembly 80 interfaced to plate insert 30.

As previously described herein, plate insert 30 is snap connected within rigid frame 25 opening 25B as illustrated in FIGS. 1, 17, and 18. As illustrated in FIGS. 16, 17, and 19 protuberance 80F bottom surface 80F1 engages outer periphery 25E of rigid frame 25 securing connector 80 therein (Ref FIGS. 17-19).

Referring to FIGS. 21 and 22, power input cable extension 82 can be cut to different lengths to facilitate placement of a device any distance away from power receptacle 85. The electrical interconnect system as in FIG. 21 allows for components to be prefabricated without the need for onsite electrical work or permitting. As illustrated in FIGS. 11 and 14, connector 80 including device power cable 80E and device power cable connector 80E1 which is shaped to promote easy interface to device 60 (FIG. 22). As illustrated in FIG. 22, Cable 80E runs flush with plate 30; and connector 80E1 connects to device 60, providing power thereto. This allows for the speaker to be mounted close to plate 30 for better structural rigidity.

Figure 20:
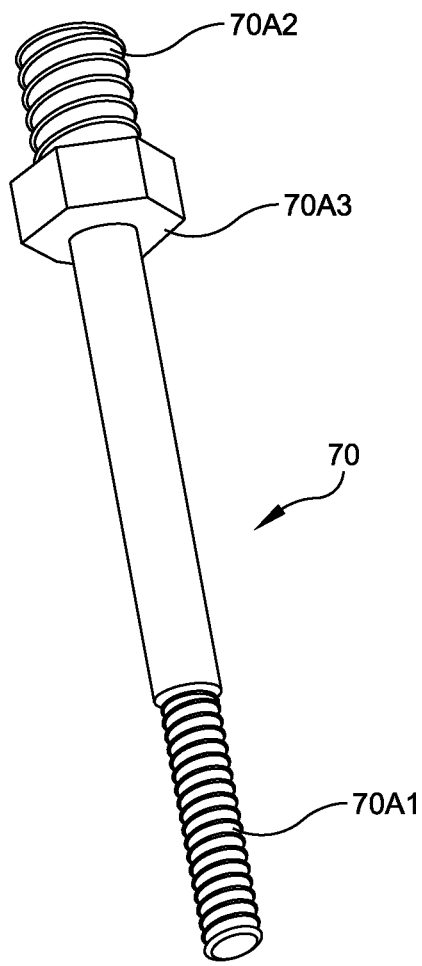
FIG. 20 illustrates an embodiment of screw 70.

As illustrated in FIGS. 18 and 20, and 23 screw 70 is utilized to mount speaker 60 to anchoring system 10. In one embodiment, screw 70 includes a first threaded end 70A1, a second threaded end 70A2, and a fixed driver nut 70A3. As illustrated in FIGS. 6 and 18, First threaded bore 40A of anchoring system 10 is engaged by first threaded end 70A1 in a counterclockwise movement while second threaded bore 70A2 engages a threaded bore on speaker 60 in a clockwise orientation. As seen in FIG. 23, by tightening driver nut 70A3 clockwise in relation to device 60, this effectively pulls device 60 towards plate 30 for a secure engagement to anchoring system 10.

It should be understood that the foregoing description is only illustrative of the invention. Thus, various alternatives and modifications can be devised by those skilled in the art without departing from the invention. Accordingly, the present invention is intended to embrace all such alternatives, modifications and variances. The present invention incorporates all drawings (FIGS. 1-23) even if not specifically referenced herein.

I claim:

1. A power feed through connector assembly comprising:
a connector having a first and second end, said first, end for receiving a power source input and said second end for providing a power source feed, said second end of said connector further including top, bottom, left and right side surfaces that terminate into an end lip, said end lip including a top and bottom surface;
a plate having a front and rear surface and including at least one opening therein, said second end of said connector engaged within said plate opening, said power source feed exiting said front surface of said plate;
a rigid frame, comprising:
at one end a lip extension, said lip extension having a closed perimeter defining a central opening , said lip extension having a front and rear surface, said lip extension further including a sidewall, said sidewall having a first end and a second end, the first end connected to the rear surface of said lip extension, the sidewall extending away from said rear surface to said second end, said second end of said sidewall defining a peripheral edge;
at least two guide members each having a middle section extending between first and second distal ends, said first, distal end of said at least two guide member secured to said sidewall, said middle sections of said at least two guide members extending away from said sidewall to said second distal end of said at least two guide members,
said at least two guide members including a crossmember therebetween; a mounting arrangement for securing said rigid frame to a wall; and wherein said plate is positioned within said central opening.

2. A power feed through connector assembly as in claim 1, wherein said bottom side surface of said second end of said connector includes a locking tab.

3. A power feed through connector assembly as in claim 1, wherein said connector is substantially L shaped.

4. A power feed through connector assembly as in claim 1,
wherein said plate further includes a circular sidewall and wherein said plate circular sidewall engages said rigid frame lip extension sidewall when said mounting plate is secured within said central opening.

5. A power feed through connector assembly, as in claim 4 wherein said cross-member is secured between said second distal ends of said at least two guide members.

6. A power feed through connector assembly, as in claim 4 wherein said first distal ends of said at least two guide members is secured to said peripheral edge of said sidewall.

7. A power feed through connector assembly as in claim 4 wherein said cross member includes a first threaded bore, and said plate includes a second threaded, bore therein.

8. A power feed through connector assembly as in claim 7 further including a fastener for securing objects, to said plate, said fastener having a middle section extending between a first and second end, said fastener second end engaging said first threaded bore of said cross member and said fastener first end engaging said second threaded bore of said plate.

9. A power feed through connector assembly as in claim 4 wherein said plate includes means for securing said plate insert within said central opening.

10. A power feed through connector assembly as in claim 1 wherein at least two of said at least two first and second guide members are 180 degrees apart.

* * * * *